United States Patent [19]

Green

[11] Patent Number: 5,440,864
[45] Date of Patent: Aug. 15, 1995

[54] INSECT CONTROL APPARATUS FOR ANIMALS

[76] Inventor: Brenda L. Green, 5014 N. 81st Dr., Glendale, Ariz. 85303

[21] Appl. No.: 229,180

[22] Filed: Apr. 18, 1994

Related U.S. Application Data

[63] Continuation-in-part of Ser. No. 79,742, Jun. 21, 1993, abandoned.

[51] Int. Cl.6 .................. B68C 5/00; A01K 13/00
[52] U.S. Cl. ........................... 54/80.5; 54/80.2
[58] Field of Search ............... 54/80.1, 80.2, 80.4, 54/80.5; 119/850

[56] References Cited

U.S. PATENT DOCUMENTS

| | | | |
|---|---|---|---|
| 4,581,877 | 4/1986 | Wilber | 54/80.2 |
| 4,662,156 | 5/1987 | Oettel | 54/80.2 |
| 5,341,627 | 8/1994 | Eby | 54/80.2 |
| 5,345,751 | 9/1994 | Edwards | 54/80.2 |

*Primary Examiner*—Robert P. Swiatek
*Attorney, Agent, or Firm*—Parsons & Associates; Don J. Flickinger; Robert A. Parsons

[57] ABSTRACT

An insect control apparatus for animals including a piece of material for covering the eyes and adjacent portions of the animal. The piece of material includes an adjustable ear opening formed in an upper edge and a hook fastener and loop fastener affixed to a convergence of a right side edge and a lower edge and a left side edge and the lower edge, to define an adjustable neck opening and an adjustable nose opening.

5 Claims, 2 Drawing Sheets

INSECT CONTROL APPARATUS FOR ANIMALS

CROSS REFERENCE TO RELATED APPLICATION

This application is a continuation-in-part of prior filed, application Ser. No. 08/079,742 entitled Insect Control Apparatus For Animals, filed 21 Jun., 1993, and now abandoned.

BACKGROUND OF THE INVENTION

1. Field of the Invention

This invention relates to animal care products.

More particularly the present invention relates to a device for animal's eyes.

In a further and more specific aspect, the present invention concerns a device as above particularly configured to protect an animal's eyes from insects.

2. The Prior Art

Insects are a major cause of irritability to animals. Insects can cause discomfort as well as infections when having access to the animal's eyes. Because it is important to keep the animal's eyes protected from insects it is of equal importance that the product chosen to do so is practical, safe, reliable, and able to withstand normal wear along with the natural elements it is exposed to. It is also important that the product provide a snug, but flexible fit that moves with the motion of the animal's head and jaw movement. Over the years several types of protective headgear have been designed.

One known device includes separate screen eye coverings for a horse's eyes that use adjustable straps to fix the eye coverings to a bridle.

Another prior art includes separate eye coverings with fringe attached under the eye coverings extending past the nostrils to protect the nostrils from flies and other insects. The device includes straps to secure it to a bridle.

Still another known device includes another example that has individual eye coverings with adjustable straps that are secured on the horse's head and neck. This device does not require the horse to wear a bridle or halter in order to secure the eye covering.

Another device includes a protective bonnet for animals, primarily horses. The entire horse's face and upper head are covered by the bonnet. The bonnet is secured to the horse's head with elastic straps above the nose and around the throat area. Additional bands are extended between the elastic bands along the side of the horse's face. A modification is shown which covers the horse's ears separately or the ears may be excluded from the bonnet.

Another device includes an eye protective device for large animals. It contains individual bulging mesh panels for each eye. It is secured to the animal's head with one strap behind the animal's ears and a pair of straps to tie beneath the animal's head.

Another known device includes an animal eye protection device primarily for horses. It comprises a bubble shaped screen extending across the animal's face above, below, and to the sides of the animal's eyes. The screen material is secured to straps across the animal's forehead and around the area below the eyes and straps along the side of the animal's face, up the head behind the ears. Hook and loop type fasteners are used to secure the straps.

Another prior art includes a fly protection device for horses which comprises of a mask that fits over the horse's face above the nose and just below the ears. There is a strap extending behind the ears to help secure the mask. There are individual eye holes with screen caps that extend outwardly.

Yet another device includes a protective mask for animal's made a continuous one piece screen which covers the eyes and adjacent facial areas of the animal with a single cutout for the ears to protrude. Relative to an animal's head, the mask has darts extending from a location below each ear to a location proximate each eye, to shape the mask, and has a hook and loop type fastener underneath the head. There is plush trim around the ear cutout and muzzle area for added comfort.

Note that the majority of the devices listed above include a type of strap arrangement for securing the mask or headgear to the animal's head. Some also include cutout areas (for the eyes) covered with a screen or other type of material that is fastened to the cutout areas, forming seams. Seams are undesirable for they can be irritating to the animal and cause additional rubbing.

Insects, such as flies, are attracted by tears. As tears run down an animal's face they form a tear path for insects to crawl up to the eyes. It is necessary to have the lower edge of the protective apparatus snug, but not tight, about the animal's face and nose, or flies and other insects might crawl up the animal's face underneath the apparatus and get to the animal's eyes.

In the first few devices listed above, individual eye protectors are used and do protect the eyes to some degree. However, this type of headgear required the individual eye protectors be applied relatively securely to the animal's face around the eye area. Some also required an additional headgear, such as a bridle or halter to attach the apparatus to. It is found that horses like to rub. Therefore the materials used to construct an insect mask must be durable and able to withstand frequent rubbing that a horse, or other animal, would do. It is also important that the mask or protective head gear is free from factors that would cause any additional rubbing, such as seams. Some of the masks listed above contain seams which could cause the horse, or animal, to rub more frequently. Seams can also cause problems with the animals skin if rubbing is very frequent.

The strap arrangement is undesirable because where the arrangement is tight around, the animal's face it can cause abrasions and discomfort to the animal.

Animals' heads vary greatly in size, so adjustability is a main factor for a good fit. Most of the previous masks have adjustability but are required to fit tightly, particularly around the nose area. Some masks have only one adjustment. A proper fit is hard to accomplish with only one adjustment.

Most of the previously mentioned devices have limited flexibility. Since horses and other animals jaws are frequently moving(while grazing or yawning) the jawline of any headgear must provide flexibility to move with the jaw motion.

Most of the previously mentioned devices do not provide a safety feature. It is important that any animal wearing headgear is able to free itself from the headgear if the headgear is caught on a fence or post to decrease the probability of the animal struggling and injuring itself. The safety feature should be such that the headgear will fall freely from the animal's head if neccessary.

The prior art tend to lose their shape due to frequent wear and washing. One such prior art is trimmed with a plush material which tends to break down when exposed to natural elements such as moisture. Because insect control masks are primarily worn in the summer, sweat is absorbed by the plush causing it to loose its shape and effectiveness. All of these conditions are undesirable and should be avoided It would be desirable in view of the shortcomings of the prior art to provide an insect control apparatus for animal's that would be durable, able to withstand natural elements (such as sun, moisture, heat, and oil) and also contain a break-away feature for the animal's safety.

It would be highly advantageous to provide an apparatus which is a one-piece mask for protecting an animal's eyes from insects and to provide a piece of elastic attached to a hook and loop fastener under the jaw area for a snug yet flexible fit and an additional hook and loop fastener to provide an adjustment at the top of the head, behind the left ear. These two adjustments would allow a better fit for the variety of sizes of animal heads. The jawline of the mask should also be flexible and able to remain snug while the animal's jaw is in motion. The top hook and loop fastener would also act as a break-away feature, allowing the apparatus to break free from the animal's head if caught on a fence, tree, wire, etc., lessening the animal's struggle and chances of injuring itself. The break-away feature would also add to the durability of the mask, as it would allow the mask to break free from the animal rather than the animal having to tear the mask free from any obstruction it may get caught on.

The apparatus should be made of relatively durable materials intended to withstand rubbing and tearing. The apparatus would include neoprene material trim on all edges to maintain the shape of the apparatus under most conditions. The neoprene material trim is extremely durable, resistant to natural elements (such as sun, moisture, heat and oils) and will not break down under normal wear and washing conditions. It would be highly advantageous therefore to remedy the foregoing and other deficiencies inherent in the prior art.

Accordingly, it is an object of the present invention to provide improvements in headgear for animals.

It is an object of this invention to supply a new and practical apparatus for protecting an animal's eyes from insects.

Another object of this invention is the provision of a safety break-away feature.

Still another object of this invention is to supply a new and practical insect control apparatus for animals that fits relatively snug, yet comfortably around the animal's head.

Yet another object of this invention is to supply a new and practical insect control apparatus that is resistant to to natural elements.

Another object of this invention is to supply a new and practical insect control apparatus that is flexible along the animal's jawline.

Still another object of this invention is to supply a new and practical insect control apparatus that provides adequate adjustability for a wide range of animal head sizes.

While another object of this invention is to supply a new and practcal insect control apparatus that is durable under normal wear and washing.

Yet another object of this invention is to supply a new and practical insect control apparatus that is able to hold its shape under normal wear and washing.

Another object of this invention is to supply a new and practical insect control apparatus for horses.

SUMMARY OF THE INVENTION

Briefly, to achieve the desired objects of the present invention in accordance with a preferred embodiment thereof, provided is an insect control apparatus for the head and eyes of an animal, the apparatus comprising a piece of material having a contoured left side edge, a contoured right side edge, a lower edge and an upper edge, an adjustable ear opening formed in the upper edge and including a first loop fastener and a first hook fastener configured to separably couple, defining the adjustable ear opening, a second loop fastener affixed to the piece of material proximate a convergence of the left side edge and the lower edge and a second hook fastener affixed to the piece of material proximate a convergence of the right side edge and the lower edge, adapted to be separably coupled to the second loop fastener to define an adjustable neck opening and an adjustable nose opening.

The insect control apparatus may further include a neoprene edging attached to the contoured left side edge, the contoured right side edge, the lower edge and the upper edge, for compressively engaging the animal, thereby providing protection and sealing engagement to prevent ingress of insects. The addition of neoprene may extend to including neoprene edging attached to the piece of material surrounding the adjustable ear opening.

In a further embodiment, the insect control apparatus includes a second ear opening formed in the piece of material adjacent the adjustable ear opening.

BRIEF DESCRIPTION OF THE PREFERRED EMBODIMENT

Figure 1:
FIG. 1 is a front view of the apparatus of the present invention secured on the head of a horse.
Figure 2:
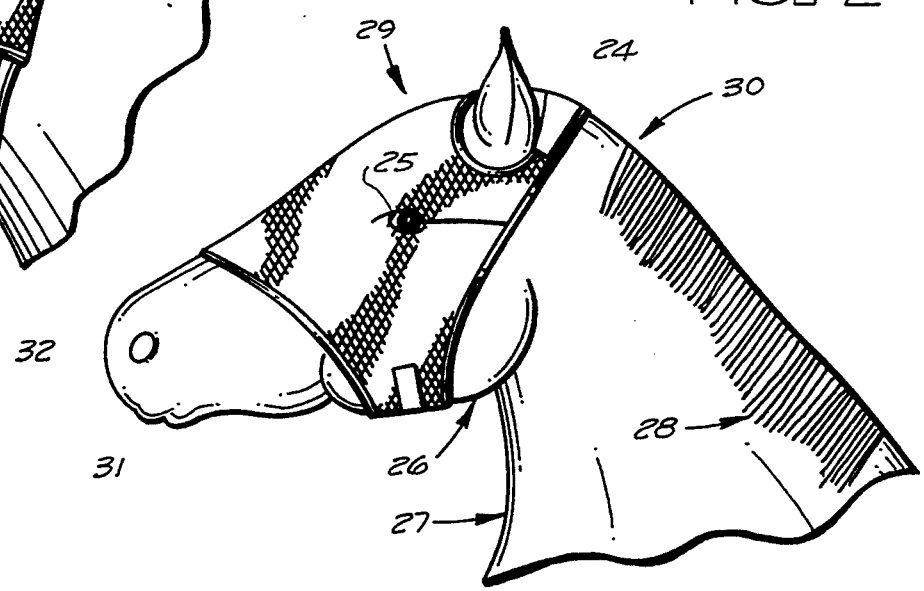
FIG. 2 is a side view of the apparatus of the present invention secured on the head of a horse.
Figure 3:
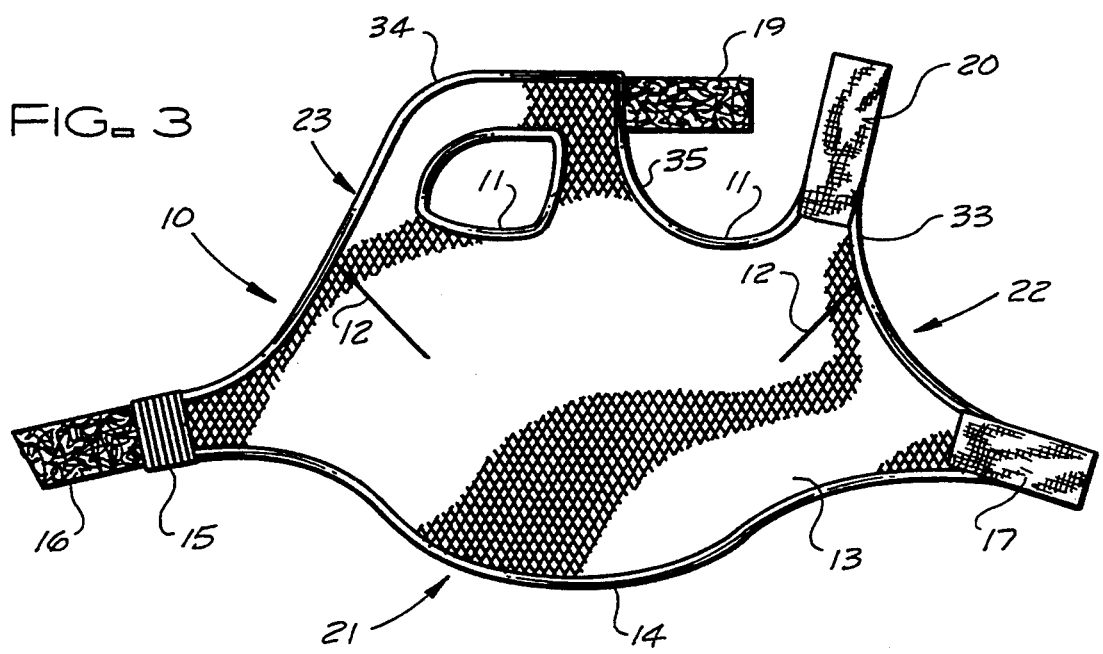
FIG. 3 is a plain view from the front of the apparatus of the present invention spread flat.

A portion of a horse(30) is shown in FIG. 1 and FIG. 2, including the neck(27) and the head(29) both Of which are necessary to the mask(10) of the present invention. For perspective purposes, the neck(27) is shown with a mane(28) and the head(29) is shown with several necessary features, all of interest to the apparatus of the present invention. The horse's head(29) is shown with a pair of ears(24) protruding upward from the top of the head. A pair of eyes(25) are shown on the horse(30), only one of which shown in FIG. 2. The horse's head(29) also includes a jaw(26). Down from the jaw(26) is the mouth(31). Upward from the mouth(31) is a pair of nostrils(32), only one of which is shown in FIG. 2. The importance of the several features described will be realized in the detailed description of the apparatus(10) of the present invention.

The insect control apparatus (10) is preferably made from an encapsulated mesh material (13). While encapsulated mesh is preferred, other materials can be used. The encapsulated material preferably consists of polyester threads coated with vinyl. An ultraviolet inhibited vinyl is a desired coating for the polyester thread. The UV inhibited coating comes in a spectrum of colors. Usually the polyester core thread is coated with vinyl. The coated thread is then woven, heated, and pressure is applied resulting in a unitary mesh fabric. The diameter of the mesh size may vary in extent of open/closed area from about 40%/60% to about 20%/80%. The greater the open area of the mesh the less obstruction of the view for the horse.

The insect control apparatus(10) shown in FIG. 1,2, and 3,4, and 5 includes a contoured left side edge(22) and a contoured right side edge(23). The contoured left side edge(22) and the contoured right side edge(23) are designed to go around the horse's head, behind the ears(24) and down (towards the rear) of the jaw(26) where the head(29) and the neck(27) adjoin. Extending inwardly from the left side edge(22) and the right side edge(23) are a pair of darts(12) which force the shape of the apparatus(10) away from the horse's eyes so that the mask is not in contact with the horse's head(29) around the area of the eyes(25).

The insect control apparatus(10) shown in FIG. 1,2, and 3,4, and 5 also includes separate ear openings(11) designed to receive the ears(24) of the horse. The ear openings(11) are trimmed with neoprene material(35). The neoprene material(35) prevents rubbing of the horse's ears(24) or adjacent hair and skin which may occur around ear openings(11) of the apparatus(10).

Figure 4:
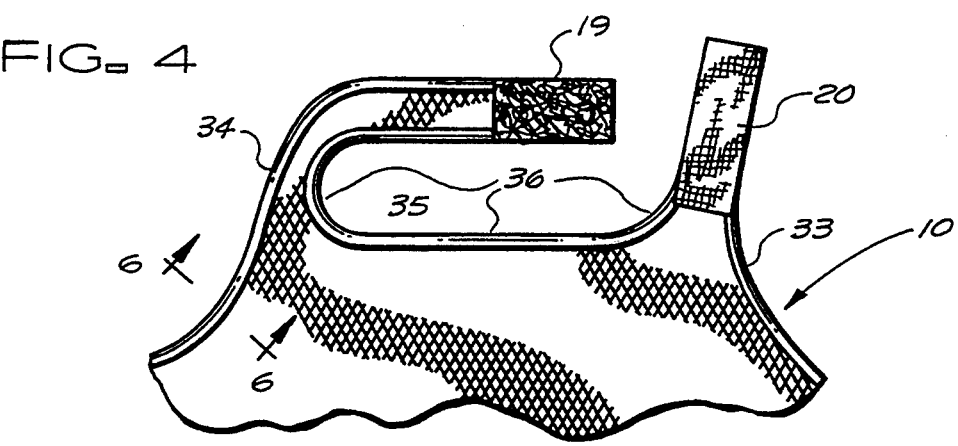
FIG. 4 is a plan view of an alternate embodiment of the apparatus of the present invention.
Figure 5:
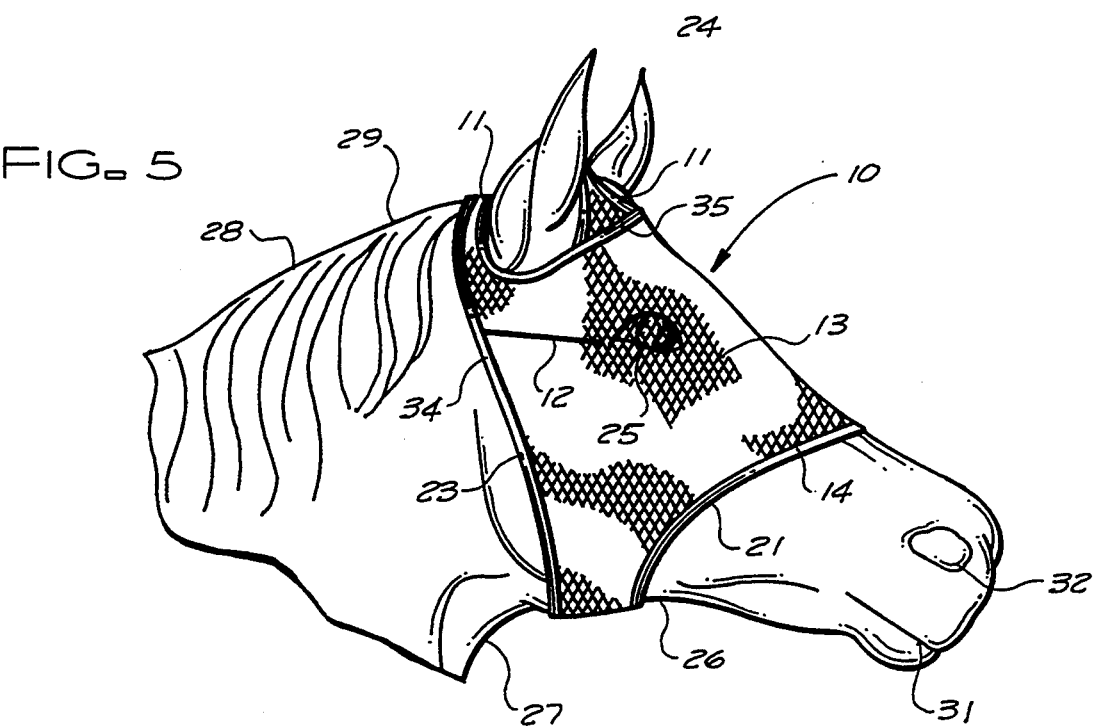
FIG. 5 is a perspective view of the apparatus of the present invention secured on the head of a horse.
Figure 6:
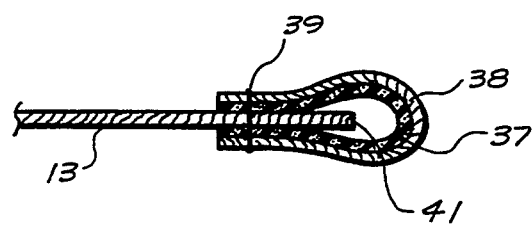
FIG. 6 is an enlarged fragmentary sectional view of the apparatus of the present invention.

The insect control apparatus (10) shown in FIG. 4 as an alternate embodiment, includes one single ear opening(36) designed to receive both ears through said opening.

The left side edge(212) includes a trim of neoprene material(33). The neoprene(33) provides greater durability and helps the apparatus(10) to maintain its shape. The left side edge(22 ) further includes a loop fastener(19) behind the left ear which defines a first end of the left side edge(22) and a loop fastener(16) under the jaw which defines a second end of the left side edge(22). The loop fastener(16) under the jaw is attached to a piece of elastic (15) which in turn is attached to the lower edge(21). The elastic(15) allows a snug yet comfortable fit for a variety of animal head sizes. The elastic(15) also stretches with the movement of the horse's head providing comfort at all times.

The right side edge(23) includes a trim of neoprene material(34). The neoprene(34) provides greater durability and helps the apparatus(10) to maintain its shape. The right side edge(23) further includes a hook fastener(20) behind the left ear which defines a first end of the right side edge(23) and a hook fastener(17) under the jaw which defines a second end of the right side edge(23). The hook fasteners(17,20) and loop fasteners(16,19) used are known as "Velcro". Other hook and loop fasteners may be used but "Velcro" is preferred.

The insect control apparatus(10) also includes a lower edge(21). The lower edge is designed to go around the horse's head, across the bridge of the nose, between the eyes(25) and the mouth(31), just slightly above the nostrils(32). The lower edge(21) also includes a trim of neoprene material(14). The neoprene provides greater durability and helps the apparatus(10) to maintain its shape.

The neoprene(14,33,34,35) is primarily for durability and moisture resistance. Its durability qualities include elasticity, resilience, strength and its resistance to water, sunlight, heat, aging, and oils. Since this apparatus will be worn by animals in all outdoor weather conditions, these qualities are of extreme importance. The neoprene material trim is a synthetic rubber made by the polymerization of chloroprene and characterized by superior resistance to oils, sunlight, ozone and heat. The neoprene(14,33,34,35) is an synthetic rubber material and other similar synthetic rubber materials such as Butyl, Hypalon, etc. may be used. The neoprene material can be covered with many types of fabric such as Lycra, Nylon, Polyester—any of which car be used. The fabric comes in a wide spectrum of colors.

The loop fastener(19) of the right side edge(23) joins the hook fastener(20) of the left side edge(22) behind the horse's left ear. The loop fastener(16) of the right side edge(23) joins the hook fastener(17) of the left side edge(22) under the horse's jaw. The loop fasteners(16) and (19), and the hook fasteners(17) and (20) are securely attached to the mesh(13) that the insect control apparatus(10) is respectively made of. The hook and loop fasteners should be used for convenience and ease of application and removal of the apparatus to the animal. The hook fastener(20) and the loop fastener(19) serve as a break-away feature to prevent needless accidents. It is known that animal's have been strangled when halters or other head gear have been caught on posts. It is also known that previous inventions become torn and destroyed in an animal's struggle to free itself if the mask is caught on a post. This is costly to the owner and dangerous to the animal. The break-away feature of the present invention is located at the top left side of the apparatus allowing the apparatus to fall freely if the animal is standing, struggling to free itself from a fence post or obstructing object. Therefore, the previously mentioned problems mentioned are solved with the use of the break-away feature of the present invention.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An insect control apparatus for the head and eyes of an animal, said apparatus comprising:
   a piece of material having a contoured left side edge, a contoured right side edge, a lower edge and an upper edge;
   an adjustable first ear opening formed in said upper edge and including a first loop fastener and a first hook fastener configured to separably couple, defining said adjustable ear opening;
   a second ear opening formed in said piece of material adjacent said adjustable ear opening
   a second loop fastener affixed to said piece of material proximate a convergence of said left side edge and said lower edge; and a second hook fastener affixed to said piece of material proximate a convergence of said right side edge and said lower edge, adapted to be separably coupled to said second loop fastener to define an adjustable neck opening and an adjustable nose opening.

2. An insect control apparatus as claimed in claim 1 further including neoprene edging attached to said contoured left side edge, said contoured right side edge, said lower edge and said upper edge, for compressively engaging said animal, thereby providing protection and sealing engagement to prevent ingress of insects.

3. An insect control apparatus as claimed in claim 2 further including neoprene edging attached to said piece of material surrounding said adjustable first ear opening and said second ear opening.

4. An insect control apparatus as claimed in claim 3 wherein said piece of material includes a mesh.

5. An insect control apparatus as claimed in claim 4 wherein said mesh includes an encapsulated mesh having polyester core thread coated with vinyl.

* * * * *